Patented Nov. 1, 1938

2,134,728

UNITED STATES PATENT OFFICE 2,134,728

AZO DYESTUFFS

Heinrich Morschel, Cologne-Deutz, and Otto Goll, Leverkusen I. G.-Werk, Germany, assignors to General Aniline Works, Inc., New York, N. Y., a corporation of Delaware No Drawing. Application July 28, 1936, Serial No. 93,117. In Germany August 16, 1935

6 Claims. (Cl. 8—46)

The present invention relates to water insoluble azo-dyestuffs and to a process of preparing same, more particularly it relates to water insoluble azo-dyestuffs which may be represented by the following general formula:

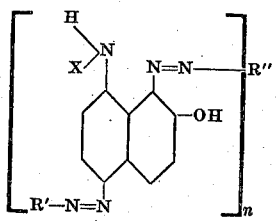

In the said formula X stands for a member selected from the group consisting of hydrogen, alkyl and aryl, R' and R'' stand for radicals of diazotization components free from solubilizing groups, and $n$ stands for one of the numbers 1 and 2.

Our new dyestuffs are obtainable by coupling suitable diazo compounds with 4-arylazo-1-amino-7-hydroxynaphthalene or their N-alkyl or N-aryl substitution products. In as much as in the aryl nucleus of the 4-arylazo group a further suitable coupling position is present, by employing a correspondingly larger quantity of diazo compound trisazo dyestuffs and so on can be manufactured.

The new dyestuffs can be manufactured with particular success on the fiber according to the method of producing ice colors as the compounds of the type of 4-arylazo-1-amino-7-hydroxynaphthalene possess a good affinity for the fiber.

The new dyestuffs yield in general powerful dark brown to black shades.

The following examples illustrate the invention:

Example 1

Cotton fiber is slop-padded with the following grounding solution: 3 parts by weight of 4(2'-methoxy)-benzeneazo-1-amino-7-hydroxynaphthalene are stirred into a mixture of 3 parts by weight of water, 6 parts by weight of alcohol and 1.5 parts by weight of an aqueous solution of caustic soda of 38° Bé., and the whole is made up to 1 liter with a solution containing per liter 10 ccs. of an aqueous solution of caustic soda of 38° Bé., 10 ccs. of purified sulfite cellulose waste liquor and 1 g. of the sodium salt of polyisobutylnaphthalene sulfonic acid. Development is effected with 1 liter of a diazo solution produced in the known manner from 1.75 gs. of 2-nitro-4-anisidine. After the dyeing has been soaped at the boil, an olive grey is obtained.

The dyestuff corresponds to the following formula:

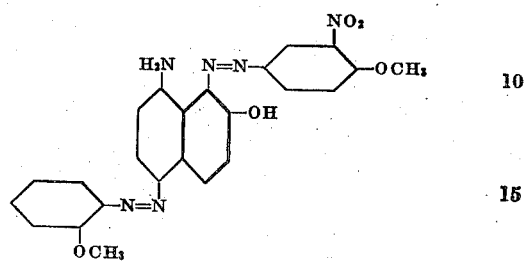

Example 2

Cotton is printed with a paste produced as follows:

A mixture of

| | |
|---|---|
| 4-(2'-chloro)-benzene-azo-1-amino-7-hydroxynaphthalene _____gs__ | 4.5 |
| The diazoamino compound from diazotized 4-chloro-2-anisidine and sarcosine___gs__ | 3 |
| An aqueous solution of caustic soda of 38° Bé _____ccs__ | 3 |
| Glycolmonomethyl ether_____ccs__ | 5 |
| Neutral starch tragacanth paste_____gs__ | 50 | is made up with water to 100 gs. After an intermediate drying, development is effected with acid steam, and then the dyeing is soaped at the boil. A black shade is obtained.

The dyestuff corresponds to the following formula:

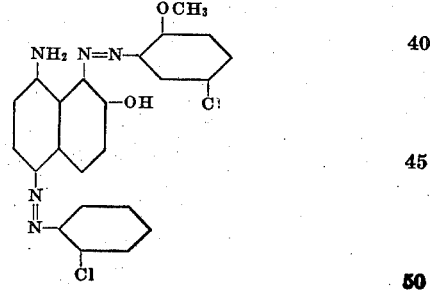

Example 3

When in the printing paste of Example 2 there is used the diazoamino compound from diazotized 4-chloro-2-toluidine and sarcosine, a saturated dark brown is obtained.

The dyestuff corresponds to the following formula:

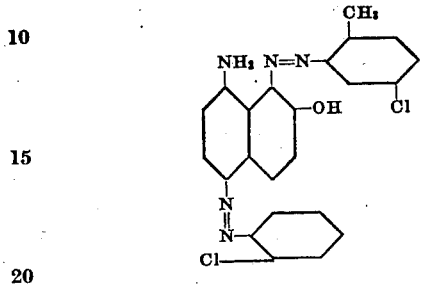

Example 4

2.5 gs. of the diazoamino compound, which is obtainable from diazotized 4,4'-diamino-3,3'-dimethoxydiphenyl and sarcosine (=1/200 mol), and 3.1 gs. of 4(2'-nitrophenylazo)-1-amino-7-hydroxynaphthalene (=1/200 mol) are stirred into a paste with the aid of a small quantity of water and dissolved by adding 3.0 ccm. of caustic soda solution of 38° Bé. and 5.0 ccm. of glycolmonoethylether while slowly heating. The solution is added to a neutral starch tragacanth paste while stirring and filled up with water to 100 gs. Cotton is printed with this paste. After drying the print is steamed for 5 minutes with steam-containing acetic acid. Then the material is rinsed, soaped at the boil, again rinsed and dried. A deep black shade is obtained.

The dyestuff has the probable following formula:

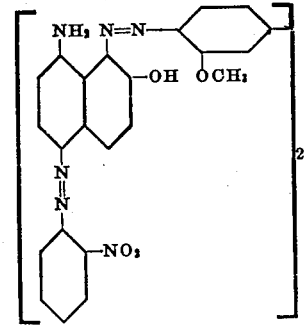

In the following table there are given further combinations prepared in accordance with the present process and their shades on cotton:

| Coupling component | Diazo component | Shade on cotton |
|---|---|---|
| 4(2'-methyl-5' chlorophenylazo)-1-amino-7-hydroxynaphthalene. | 2-nitro-4-chloraniline | Olive-brown. |
| Do | 4'-nitro-4-amino-2,5-dimethoxyazobenzene | Blackish brown. |
| Do | 3-chloraniline | Greyish brown. |
| Do | 2,5-dichloroaniline | Brown-olive. |
| 4(2'-methoxy-5'-chlorophenylazo)-1-amino-7-hydroxynaphthalene. | | |
| Do | 2-chloro-5-methoxy-4-benzoylamino-1-aminobenzene | Blackish brown. |
| | 4-nitro-2-amino-1-methylbenzene | Olive-brown. |
| 4(2'-methoxy-5'-chloro-1-amino-7-hydroxy-naphthalene | 4-chloro-2-amino-1-methoxybenzene | Brownish black. |
| 4(2'-nitrophenylazo)-1-amino-7-hydroxy-naphthalene | 5-nitro-2-amino-1-methoxybenzene | Greenish black. |
| Do | 4-chloro-3-amino-1-trifluoromethylbenzene | Reddish black brown. |
| Do | 3-chloraniline | Greenish black brown. |
| 4(2'-chlorophenylazo)-1-amino-7-hydroxynaphthalene | 4-chloro-2-amino-1-methoxybenzene | Bluish dark brown. |
| Do | 1-amino-anthraquinone | Dark brown. |
| Do | 2',3-dimethyl-4-aminoazobenzene | Brownish olive. |
| 4(2'-methoxyphenylazo)-1-amino-7-hydroxynaphthalene | 2,5-dichloraniline | Do. |
| Do | 3-chloraniline | Dark brown. |
| 4(2'-nitro-4'-methylphenylazo-1-amino-7-hydroxynaphthalene. | | |
| 4(2'-methoxyphenylazo)-1-amino-7-hydroxynaphthalene | 3-amino-4-chloro-1-trifluormethylbenzene | Blackish brown. |
| 4(2'-nitro-4'-methylphenylazo)-1-amino-7-hydroxynaphthalene. | 5-chloro-2-amino-1-methylbenzene | Do. |
| Do | 4-chloro-2-amino-1-methoxybenzene | Do. |
| 4(2'-nitro-4'-methoxyphenylazo)-1-amino-7-hydroxynaphthalene. | 4-chloro-2-amino-1-methylbenzene | Do. |
| 2(2'-nitro-4'-methoxyphenylazo)-1-amino-7-hydroxynaphthalene. | 5-nitro-2-amino-1-methoxybenzene | Greenish black brown. |
| 4(2'-nitro-4'-methoxyphenylazo)-1-amino-7-hydroxynaphthalene. | 5-chloro-2-amino-1-methoxybenzene | Blackish brown. |
| 4(7'-hydroxynaphthyl-(1')-azo)-1-amino-7-hydroxynaphthalene. | 5-nitro-2-amino-1-methylbenzene | Olive dark brown. |
| Do | 4-nitro-1-amino-benzene | Do. |
| Do | 2-aminodiphenyl-sulfone | Yellowish dark brown. |
| 4(2'-nitrophenylazo)-1-methylamino-7-hydroxynaphthalene. | 4-chloro-2-amino-1-methoxybenzene | Black. |
| Do | 5-chloro-2-amino-1-methylbenzene | Blackish brown. |
| 4(2'-methoxy-5-chlorophenylazo)-1-methylamino-7-hydroxynaphthalene. | 4-chloro-2-amino-1-methoxybenzene | Greenish black. |
| Do | 5-chloro-2-amino-1-methylbenzene | Brown. |
| 4(3'-chlorophenylazo)-1-ethylamino-7-hydroxynaphthalene. | 3-chloraniline | Dark olive brown. |
| 4(2'-nitrophenylazo)-1-ethylamino-7-hydroxynaphthalene. | 5-nitro-2-amino-1-methoxybenzene | Greenish black. |
| 4(2'-nitrophenylazo)-1-phenylamino-7-hydroxynaphthalene. | 2,5-dichloraniline | Olive brown. |
| Do | 4-nitraniline | Olive. |
| 4(4'-nitrophenylazo)-1-(4''-methoxyphenylamino)-7-hydroxynaphthalene. | 5-nitro-2-amino-1-methoxybenzene | Greenish blackish brown. |
| Do | 2,5-dichloraniline | Blackish brown. |
| Do | 4-nitraniline | Yellowish dark brown. |

We claim:
1. Water insoluble azodyestuffs of the general formula:

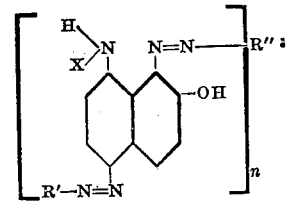

wherein X stands for a member selected from the group consisting of hydrogen, alkyl and aryl, R' and R" stand for different radicals of diazotization components free from solubilizing groups, and $n$ stands for one of the numbers 1 and 2, yielding when produced on the vegetable fiber in general brown to dark shades.

2. A water insoluble azodyestuff of the formula:

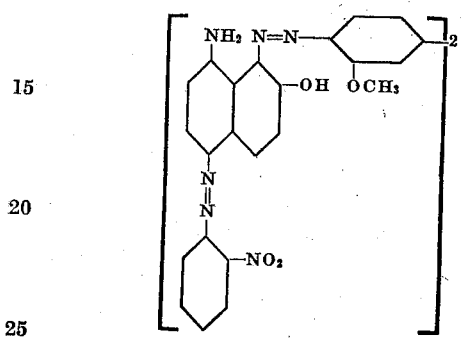

yielding when produced on the vegetable fiber deep black shades.

3. Fibers dyed with a dyestuff as claimed in claim 1.

4. Fibers dyed with a dyestuff as claimed in claim 2.

5. The process for the manufacture of water-insoluble azodyestuffs which comprises combining on the fiber a diazo compound free from solubilizing groups derived from an amine selected from the group consisting of monamines, diamines and amino azo compounds with a compound of the general formula:

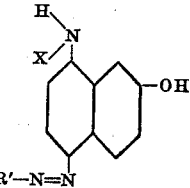

wherein X stands for a member selected from the group consisting of hydrogen, alkyl and aryl, R' stands for the radical of a diazotization component free from solubilizing agroups, yielding when produced on the fiber in general brown to dark brown to black shades.

6. The process for the manufacture of water-insoluble azodyestuffs which comprises combining on the fiber a diazo compound free from solubilizing groups derived from an amine selected from the group consisting of monamines, diamines and amino azo compounds with a compound of the general formula:

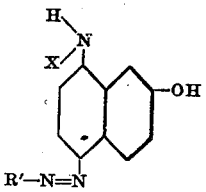

wherein X stands for a member selected from the group consisting of hydrogen, alkyl and aryl, R' stands for a radical of the benzene series free from solubilizing groups, yielding when produced on the fiber in general brown to dark brown to black shades.

HEINRICH MORSCHEL.
OTTO GOLL.